March 21, 1961 R. Q. EDWARDS 2,976,047

AUTOMATIC RESTACKING MECHANISM FOR PHONOGRAPH

Filed Aug. 29, 1958 3 Sheets-Sheet 1

INVENTOR
ROY Q. EDWARDS
BY [signature]
HIS ATTORNEY

March 21, 1961 R. Q. EDWARDS 2,976,047

AUTOMATIC RESTACKING MECHANISM FOR PHONOGRAPH

Filed Aug. 29, 1958 3 Sheets-Sheet 2

INVENTOR.

ROY Q. EDWARDS

BY

[signature]

HIS ATTORNEY

INVENTOR.
ROY Q. EDWARDS
BY
HIS ATTORNEY

United States Patent Office 2,976,047

Patented Mar. 21, 1961

2,976,047

AUTOMATIC RESTACKING MECHANISM FOR PHONOGRAPH

Roy Q. Edwards, Elkins Park, Pa., assignor to Leon S. Gross, Philadelphia, Pa.

Filed Aug. 29, 1958, Ser. No. 758,000

13 Claims. (Cl. 274—10)

My invention relates generally to an automatic record changing phonograph and particularly to a device for automatically and continuously replaying a stack of records for an indefinite period of time.

My invention is adapted to be utilized with the type of phonograph wherein a stack of records which are initially mounted on a vertical shaft above the turntable may be played, in sequence, by automatically dropping the records, one by one, to the turntable. With most of the phonographs presently on the market, after the last record has been played one must manually place the entire stack of records in the replaying position. Where it is desired to utilize the records to provide background music, for instance, in waiting rooms, banks or other public places it is desirable to automatically restack in the playing position the stack of records and subsequent to the restacking to replay the records automatically.

It is an object of my invention to provide mechanisms for automatically restracking the records for replaying after all of the records have been played in sequence.

Another object is to provide a restacking mechanism having a time delay between the completion of the playing of the last record of the stack and the initiation of the restacking operation.

A further object is to provide restacking mechanisms having a minimum number of parts, simple to manufacture and easy to add to phonographs presently in use or now on the market.

A further object is to provide a restacking mechanism which may be used in connection with records of various sizes, such as, 7 inch diameter, 10 inch diameter, and 12 inch diameter records, in any arrangement or intermixture.

A still further object is to provide a restacking mechanism that is self aligning with respect to the turntable.

One embodiment of my invention provides a disc having a suitable opening coaxially aligned with the turntable by depending peripheral, spaced projections. The disc is positioned on the turntable and supports the records when they are being played, the disc and records being rotated by the turntable. The periphery of the disc is slidably engagable with and supportable by a ring that is elevated and lowered by vertically moving rods actuated by a mechanism synchronized with the playing cycle of the phonograph.

When the last record of the stack of records has been played the phonograph mechanism automatically de-energizes the turntable and swings the tone arm away from the records through a suitable switch. A time delay device provides a time delay between the energization of the restacking mechanism and the initiation of the restacking operation during which time the rotational inertia of the turntable is expended.

When the turntable has stopped or so slowed down that no scraping will take place between the top of the turntable and the bottom of the disc, the restacking operation is initiated. A motor drives, through suitable mechanism, rods that are secured to the ring. The rods and the ring, disc and the stack of records are raised thereby to the replaying position on the supporting shaft.

The supporting shaft or stem has its upper portion offset laterally with respect to its lower portion to provide support at the offset for the stack of records, in a manner well known in the art. In moving along the shaft upwardly, as the records are being placed on the offset portion of the shaft, the stack of records moves laterally across the face of the disc and the disc itself moves relatively to the ring, within the limits of the clearance between the disc and ring. In so doing the disc is no longer coaxially aligned with the turntable and the disc is lowered in this off axis position after the records are restacked. As the disc approaches the turntable the depending projections on the underside of the disc engage the turntable and coaxially realign the disc with the turntable. Thereafter, the restacking mechanism is provided with suitable means for energizing the playing cycle of the phonograph and the records are thereafter dropped one by one onto the turntable and played in sequence until the stack upon the support is exhausted and thereafter the restacking operation is reinitiated. Where restacking mechanisms have depended upon devices engaging the rim of the bottommost record of the stack extending beyond the turntable it has not been practical to elevate the bottommost record where the diameter of the bottommost record was less than the diameter of the turntable or other member supporting the record for playing. It is another object of the present invention to provide a restacking mechanism which will elevate all the records regardless of size and without regard to their arrangement in the stack.

The foregoing and other objects of my invention, the principles of my invention, and the best forms in which I have contemplated applying such principles will more fully appear from the following description and accompanying drawings in illustration thereof.

Figure 2:
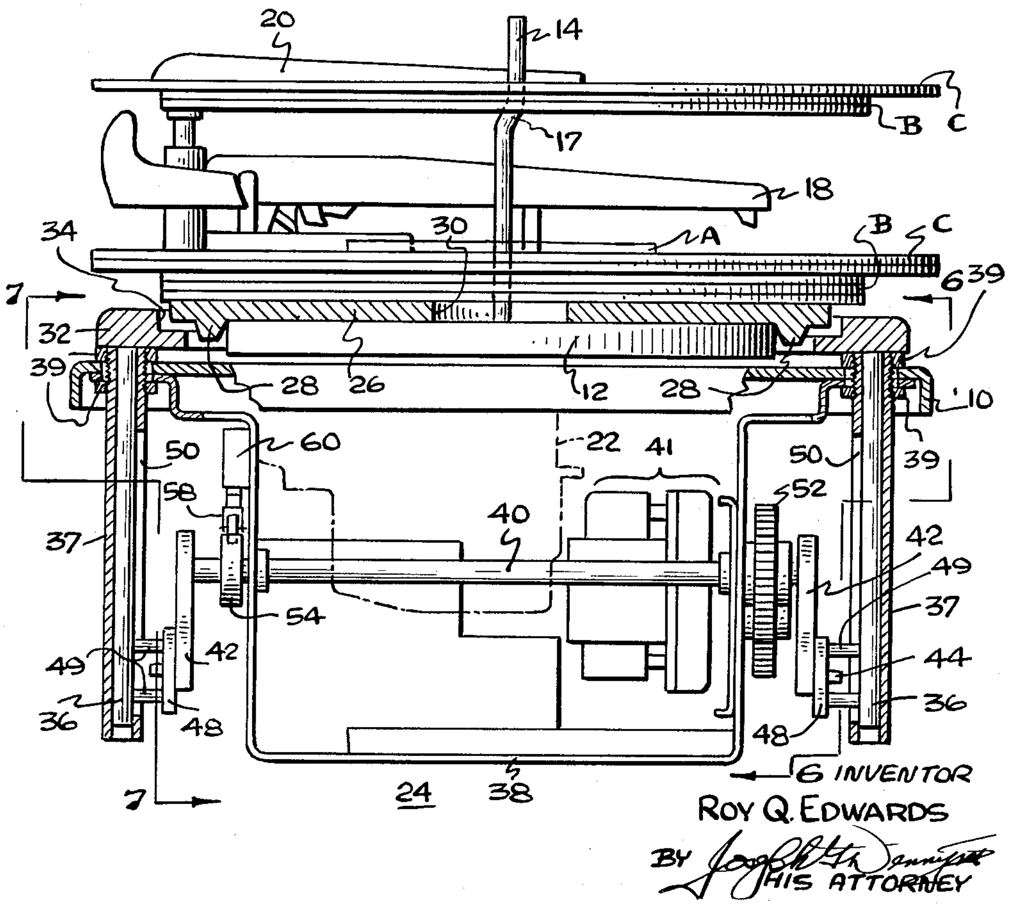
Fig. 2 is a view partly in cross section and partly in elevation taken along the line 2—2 of Fig. 1 illustrating the normal position of the phonograph immediately before playing of a record and in which certain elements of the phonograph have been shown in dot-dash lines.
Figure 5:
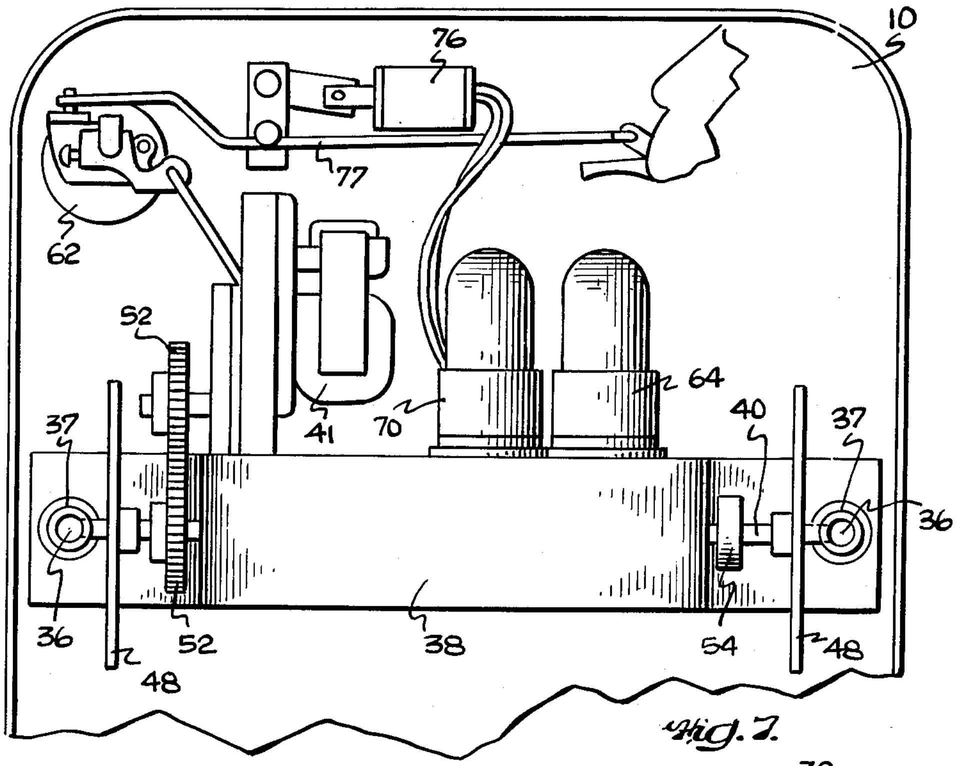
Figure 7:
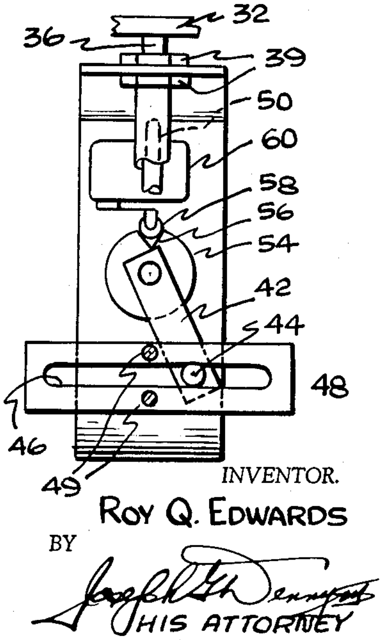
Figure 6:
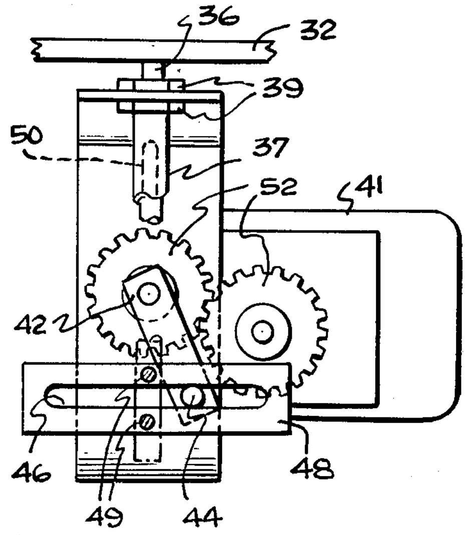

Fig. 5 is a fragmentary bottom view showing the restacking mechanism added to the table of the phonograph; and Figs. 6 and 7 are side elevations taken along the lines 6—6 and 7—7 of Fig. 2 respectively.

Referring to the drawings in detail there is illustrated a phonograph to which the restacking or reloading mechanism of my invention has been added. The phonograph includes a table 10 and a centrally located turntable 12 provided with a vertical shaft 14 for supporting a stack of records 16 upon a laterally offset portion or support 17 of the vertical shaft 14 in a non-playing position. Positioned upon the table 10 is a tone arm 18 for playing the records, a feeler 20 for sensing when the stack of records 16 upon the support 17 has been exhausted for the hereinafter described purpose and a phonograph control switch 21 for regulating the phonograph.

As illustrated in Fig. 2 in dot-dash lines, the underside of the table 10 is provided with the usual phonograph elements 22 of the phonograph. Such phonograph elements 22 which include a record playing and changing motor 23 (shown diagramatically in Fig. 4) and other devices usually utilized in playing the records, are generally clustered about the underside of the table 10 and are illustrated in dot-dash lines only since they are well known in the art.

Figure 3:
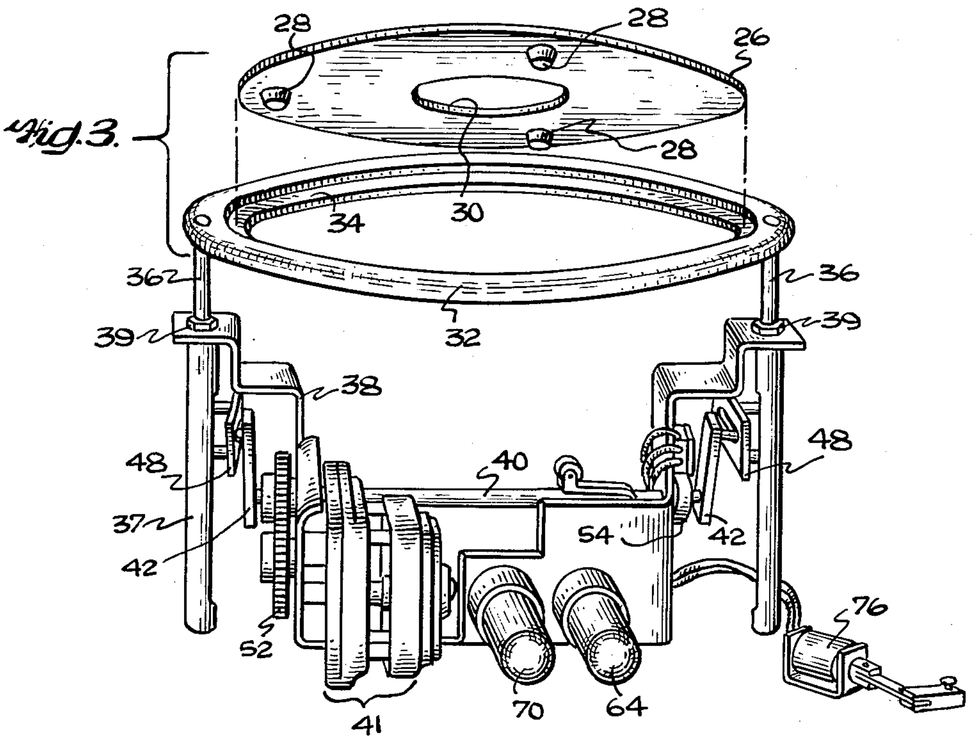
Fig. 3 is a front elevation of the restacking mechanism, wherein the disc has been exploded from the supporting ring and tilted upwardly from its normal position to illustrate the depending peripheral projections which align the disc coaxially with the turntable.

A restacking mechanism 24 comprises a disc 26 coaxially aligned with the turntable 12 by peripheral and equi-spaced tapered projections 28, as illustrated in Figs. 2 and 3. During the playing of the records the disc 26 rests upon the turntable 12 and is frictionally rotated thereby, the records being successively dropped down along the shaft 14 to the disc 26 for playing. The disc 26 has a radially outer margin or rim portion extending radially beyond the radially outer margin or rim portion of the turntable 12, as illustrated in Fig. 2. The disc 26 is provided with a central opening 30, through which the vertical shaft 14 extends which is large enough to freely clear the shaft 14 and its offset or support 17. The opening 30 is made large enough to accommodate the largest size vertical shafts now on the market which, presently, are those used for 45 r.p.m. records. The disc 26 is elevated and lowered in the restacking operation by an annular support member or ring 32, as hereafter described.

As is well known there are presently on the market multi-size records A, B, C, illustrated in Fig. 2. Primarily the multi-size records A, B and C are of 7 inch diameter, 10 inch diameter and 12 inch diameter, respectively. Thus phonographs that are constructed to play all three sizes of records mentioned are usually provided with turntables having a minimum size of about 8 inches in diameter. The reason for this is that if smaller turntables are utilized (even though suitable for the 7 inch records), when playing the 10 inch or 12 inch records, slippage between records might occur and they might be distorted, which might impair the sound of the reproduction and possibly permanently damaging the records themselves.

Thus, the turntable 12 may be of of a range between 8 and 11 inches in diameter though the former is the more common size. The disc 26 is made large enough to extend beyond the rim of the turntable 12 so that the disc tends to be closer to the size of the largest records rather than the smallest. When the ring 32 moves upwardly it engages the disc 26 and moves the entire stack of records regardless of whether the bottommost record is a 7 inch, 10 inch or 12 inch record and regardless of the intermixture of such records in the stack. If there were no such disc 26 and the ring 32 merely engaged the rim of the bottommost record that extended beyond the turntable 12, the smaller 7 inch records inwardly of the rim of the turntable below the first record extending beyond the rim of the turntable would not be moved upwardly and, hence, would not be replaced upon the support 17.

The ring 32 is provided with a flange 34 on the inner periphery of the ring 32. The flange 34 engages the outer margin or rim of the underside of the disc 26 extending radially outwardly of the tapered projections 28 during the restacking operation, as subsequently described. The flange 34 is of sufficient depth or width so that it is not completely covered by the disc 26, thus allowing the disc 26 to move laterally to an off-axis position incidental to the lateral movement of the records during their movement to the support 17. The lateral clearance between the disc 26 and the larger periphery of the flange 34 is not greater than that necessary to facilitate engagement between the flange 34 and disc 26. When the flange 34 is in contact with the under surface of the disc 26 there is no engagement or interference between the top surface or peripheral rim of the ring 32 and any of the records of the stack.

The ring 32 is raised and lowered by a pair of vertically disposed elevating rods 36 slidable in vertically disposed bushings 37. The rods 36 extend through aligned holes in the table 10 and a U-shaped frame 38. The bushings 37 and the U-shaped frame 38 are rigidly secured to the table 10 by suitable threaded nuts 39, as illustrated.

As illustrated in Figs. 2, 6 and 7, a shaft 40, rotated by a suitable restacker motor 41 mounted on the U-shaped frame 38, actuates, through suitable devices hereinafter described, the rods 36. The shaft 40 extends through holes in the legs of the U-shaped frame 38 and is rigidly connected at opposite ends to crank arms or links 42 that are secured to slides 44 movable in horizontal grooves 46 formed in horizontal member 48 rigidly connected to the rods 36 by pins 49 extending through vertical slots 50 in the bushings 37. Thus, the rotary motion of the motor 41 is transmitted to the shaft 40 through gears 52, mounted on the U-shaped frame, and this rotary motion is translated into a vertical movement of the rods 36 by the foregoing devices.

Secured to the left-hand end portion of the shaft 40 between the left crankarm 42 and the left leg of the U-shaped frame 38, as illustrated in Fig. 2, is a cam 54 having a low portion defined by a notch 56 (Fig. 7). Biased against the cam 54 is a rider 58 connected to and actuating a switch 60 having stationary contacts G and K and a movable contact H utilized in controlling the restacking operation, as subsequently described.

Figure 4:
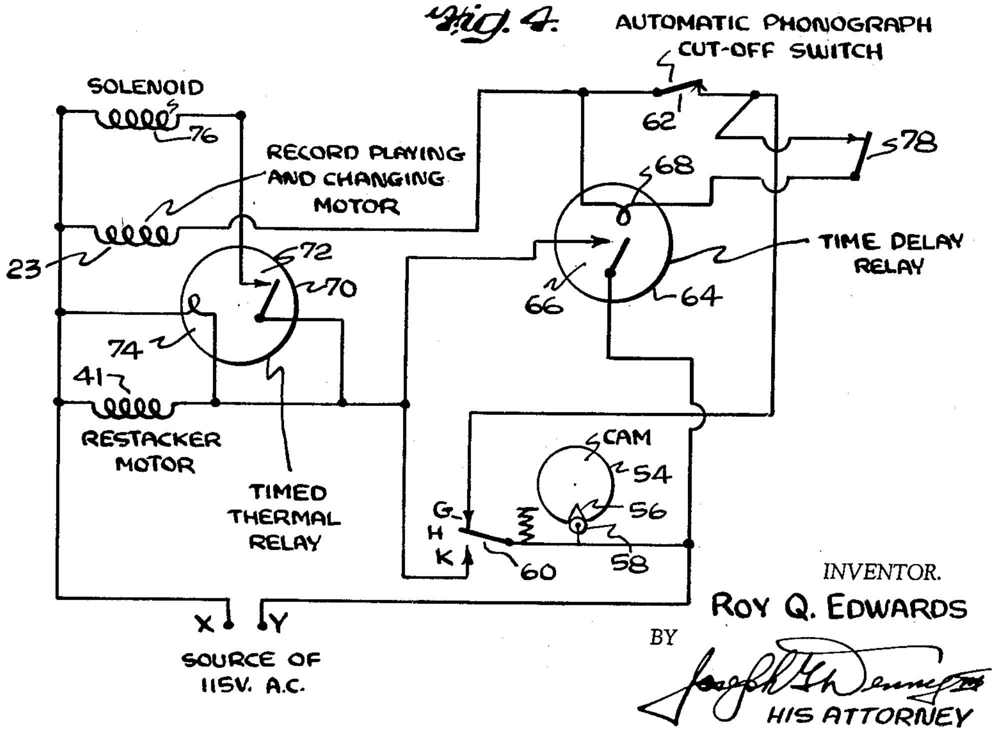
Fig. 4 is a schematic circuit illustrating the electric circuit of the restacking mechanism and a portion of the circuit of the playing mechanism with which it cooperates.

The phonograph is provided with an automatic phonograph cutoff switch 62 (Fig. 4) that cooperates, in a manner well known in the art, with the tone arm 18 and the feeler 20 for de-energizing the record playing and changing motor 23 (shown schematically only in Fig. 4).

In addition to the switch 60, the restacking operation in controlled by a thermal delay relay 64 including a switch 66 and a heater 68, the heater being disposed in electrical parallel with the cutoff switch 62. Also, a timed thermal relay 70 is utilized including a switch 72 and a heater 74, the heater 74 being disposed in electrical parallel with the restacker motor 41, for energizing a solenoid 76 during the restacking operation, as subsequently described. The relays 64 and 70 and the solenoid 76 may be types well known in the art, hence they are not illustrated in detail.

The restacked motor 41 is initially energized by opening the cutoff switch 62, allowing the heater 68 of the thermal relay 64 to heat up and close the switch 66 contained therein for supplying current to the restacker motor 41 in accordance with the circuit in Fig. 4. Once the restacker motor 41 starts to operate it elevates the rods 36, ring 32 and disc 26 and rotates the cam 54. Rotation of the cam 54 lifts the rider 58 out of the notch 56, opening the contact GH and closing the contacts HK of switch 60. Current is now supplied directly to the restacker motor 41 through the contacts HK. When the contacts HK of switch GH are closed and the contacts GH are opened the record changing and playing motor cannot be energized until the restacking operation is completed and the contacts GH are reclosed. Thus, a safety feature is provided because during the restacking operation the record changing and playing motor cannot be energized by accidental or inadvertent movement of the tone arm 18 into the position that closes the contacts of the switch 62.

Since the heater in the timed thermal relay 70 is connected in electrical parallel with the restacker motor 41 to close the switch 72 for energizing the solenoid 76, the actuation of the solenoid is timed by the restacker motor in the sense that the switch 72 will close after the restacker motor 41 has been energized. The solenoid 76 actuates the cutoff switch 62, through links 77 (Fig. 5), before the restacking operation is complete so that the cutoff switch 62 returns to the position where it can short out the relay 64 before the restacking operation is completed.

If desired, a switch 78 may be interposed between the time delay relay 64 and the cutoff switch 62 for omitting the operation of the restacker mechanism when expedient to do so. In Fig. 4 the electrical circuit of the restacker mechanism is shown as it is incorporated into the circuit of the phonograph. The circuit shown in Fig. 4 is in the position for energization of the record playing and changing motor 23, i.e., during normal operation of the phonograph in which the records are played successively.

Figure 1:
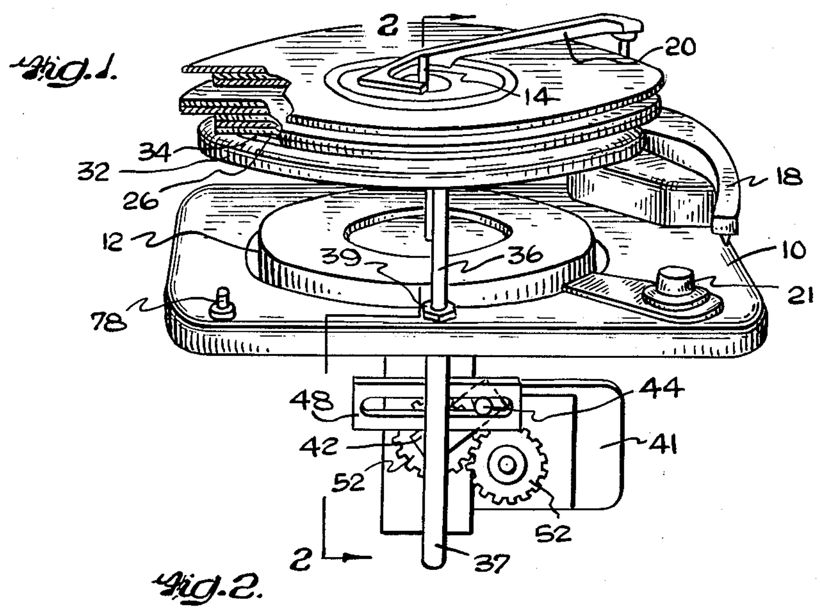
Fig. 1 is a perspective illustration viewed from the top and one side of a phonograph, to which the restacking mechanism constructed in accordance with my present invention has been added, illustrating the restacking mechanism when it is positioning the stack of records upon the supporting shaft.

In operation, initially the stack of records 16 is placed manually upon the support 17 in the non-playing position. The phonograph is energized by suitable manual movement of the control switch 21 (Fig. 1) and the automatic record playing and changing cycle commences, each of the records being dropped automatically by the phonograph into the playing position one above the other upon the disc 26. When the last, viz., topmost record, as sensed by the feeler 20 and the tone arm 18, has been played the cutoff switch 62, which was moved to the "On" or energized position simultaneously with the manual movement of the control 21, to the energized position, is moved to the "Off" or de-energized position automatically by the phonograph for de-energizing the record playing and changing motor 23.

Referring to Fig. 4, movement of the cutoff switch 62 to the off position removes the short circuit condition previously existing across the heater 68 of the relay 64 and fully energizes it. It will be noted that the heater 68 of relay 64 is in series with the record playing and changing motor 23 but the resistance of the heater of the relay 64 is high enough to prevent the record playing and changing motor 23 from operating at this time. The time necessary for the heater of the relay 64 to attain the temperature to close the switch 66 of the relay 64, allows the turntable to stop or substantially expend its rotational energy before the restacked motor 41 is energized. At the end of this waiting period the switch of the relay 64 closes and the restacker motor 41 is energized, rotating the shaft 40, the cam 54 and elevating the rods 36. As soon as the cam 54 starts to rotate the contacts GH open and contacts HK close, as previously described, supplying currently directly to the restacker motor 41. Thus, current is supplied to the relay 70 through contacts HK (after the cam starts rotating).

Rotation of the restacked motor 41 causes the rods 36, ring 32 and disc 26 to be elevated by the gears 52, crankarms 42 and slide 44 previously described. The cam and other members are proportioned so that in one revolution of the cam the disc is elevated sufficiently to raise the stack of records to a position immediately above the support 17 for positioning thereon, the disc 26 is returned to the turntable 12, and the ring 32 is lowered until it is spaced from the disc 26 and preferably rests upon the upper nuts 39, as illustrated in Fig. 2.

In moving past the support 17 the stack of records is forced to move laterally. Since the bottommost record of the stack is in frictional contact with the disc 26, the disc 26 is also incidentally moved laterally on the flange 34 and is no longer coaxial with the shaft 14 of the turntable. If the disc were to return to the turntable in this laterally offset position the rotation of the turntable and the records to be played would be impaired because of the dynamic unbalance introduced by the offset disc 26.

As the rotation of the restacker motor continues, the disc 26 is lowered down to and comes to rest upon the turntable 12 while the stack of records remains upon the support 17. When the disc approaches the turntable, the tapered projections 28 engage the outer rim of the turntable and coaxially position the disc with respect to the turntable. The rods are lowered sufficiently to allow the ring to drop away from the disc, as illustrated in Fig. 2. Preferably the rods are lowered sufficiently to allow the ring to rest upon one of the nuts 39 securing the bushings 37 to the table 10.

After the cam 54 starts to rotate but prior to the completion of one revolution of the cam 54 the relay 70 is heated sufficiently to close its switch 72, energize the solenoid 76 and move the cutoff switch 62, by the links 77 illustrated in Fig. 5, to the "On" position for shorting out the heater 64 of the relay 54. When the cam 54 completes one rotation the rider 58 drops down into the notch 56, the contacts HK open and the contacts HG close and thereafter the heater of the relay 70 cools and the associated switch 72 opens.

After the restacker motor 41 is energized through contacts HK and during the time necessary for one revolution of the cam 54 the heater 68 of the relay 64 cools sufficiently to return its switch 66 to the "Off" position.

When the cam completes one revolution the restacker mechanism has placed the stack of records upon the support 17, lowered the disc 26 to the turntable 12, and lowered the ring and rods below the turntable 12. Thus, upon the completion of one revolution of the cam and the opening of the contacts HK and the closing of the contacts GH, the phonograph begins to replay the stack of records. Upon the completion of the playing of the topmost record in the stack the restacking operation is again repeated. The playing and replaying of the records may thus continue indefinitely.

Having described my invention, I claim:

1. In a phonograph having a turntable and a central shaft extending through said turntable with an offset position on said shaft for supporting a plurality of records and automatic means for dropping said records one by one to said turntable and for playing same, a restacking mechanism for lifting the records to the support position above the turntable after all of said records have been rotated on said turntable comprising a disc rotatable on and supported by said turntable, said disc having a diameter greater than the diameter of said turntable, a central opening in said disc having a diameter at least as great as twice the distance between the outermost periphery of said offset and the axis of said central shaft, means for elevating said disc to said offset position on said shaft and for returning said disc to said turntable, and other means for centering said disc on said turntable when it is returned to said turntable from said raised position.

2. A restacking mechanism as set forth in claim 1 in which said means for elevating said disc includes a ring having an inner diameter greater than said turntable and less than the diameter of said disc, said ring being engageable with said disc for moving said disc to and from said record support position and being positioned below said disc when not engaged with said disc.

3. A restacking mechanism as set forth in claim 1 in which said other means includes spaced projections on the underside of said disc.

4. In a phonograph capable of supporting a plurality of records above a turntable on a support member on a shaft extending above said turntable and automatically playing said records after they are individually dropped to said turntable, an automatic restacking record mechanism comprising a disc supported by said turntable and capable of being elevated above said turntable, means including a ring-like member for elevating said disc and records to the support position on said shaft above said turntable, said ring-like member including a lateral offset for accommodating lateral movement of said disc incident to the lateral movement of said records as they are moved upwardly past said support member on said shaft, and other means for centering said disc on said turntable.

5. In an automatic record changer having a turntable and a support shaft associated therewith for receiving and holding a plurality of multi-size records to be played on said turntable, the combination therewith of an adaptor restacking mechanism for moving said records between a playing position and a non-playing position comprising a disc rotatable with said turntable, said disc having a rim extending beyond said turntable, a support member engageable with said rim of said disc, and means for actuating said support member for moving the records from the playing position to the holding position.

6. In an automatic record changer having a turntable and a support shaft including an offset portion for receiving and holding a plurality of records to be played on said turntable, the combination therewith of an adaptor restacking mechanism comprising a disc rotatable with said turntable, a support member engageable with said disc, spaced projections on the underside of said disc for centering said disc with respect to said turntable, rods secured to said support member for actuating the latter, and means for actuating said rods to elevate the records from the turntable to a position above said offset portion of said support shaft and to lower said support member and said disc, said disc being slidable on said support member for incidental lateral movement of said disc relative to said support member during elevation of said records.

7. In an automatic record changer having a support above the turntable for a stack of records to be played and a rotatable turntable for successively playing the records, the combination therewith of a restacking mechanism comprising a disc supported by said turntable and rotatable thereby, a member for supporting said disc; means including said member operable upon the termination of the playing of the last record of the stack to elevate the disc and records thereon to a position above said support and to return the disc to said turntable, said means including devices for delaying the elevation of the stack of records until the rotation of said turntable has substantially stopped after the playing of the last record.

8. In an automatic record changer having a turntable and a shaft including an offset portion for supporting a stack of multi-size records, said turntable being rotatable for successively playing said multi-size records, said turntable having a diameter intermediate the diameters of the largest and the smallest records rotatable thereby, the combination therewith of a restacking mechanism for moving said records between a playing position on said turntable and a non-playing position on said shaft above said turntable comprising a disc disposed on said turntable and rotatable thereby, said disc having a rim extending beyond the rim of said turntable, a member for lifting the disc by said rim, and means operable upon the termination of the playing of the last record in the stack to move said member, said means thereafter lowering said member until said disc rests upon said turntable and said member is free of said disc, said means including devices for delaying the movement to the non-playing position of the stack of records until said turntable has been substantially stopped, said disc including a centering means for coaxially aligning said disc with said turntable upon the lowering of said disc upon said turntable.

9. In an automatic record changer the combination of a turntable and a shaft including a portion for supporting a stack of multi-size records, said turntable being rotatable for successively playing said multi-size records, said turntable having a diameter intermediate the diameter of the largest and the smallest records rotatable thereby, a restacking mechanism for moving said records between a playing position on said turntable and a non-playing position on said support of said shaft above said turntable comprising a disc disposed above said turntable and rotatable thereby, said disc having a rim extending beyond the rim of said turntable, a support member for supporting said rim of said disc, and means operable upon the termination of the playing of the last record in the stack to elevate said member and said disc for placing said stack of records upon said support member in the playing position and to lower said support member and said disc until said disc is upon said turntable and free of said support member, said means including devices for delaying the elevation of the stack of records until said turntable has substantially stopped.

10. In an automatic record changer for phonographs of the drop type adapted to play multi-size records including a turntable adapted to rotate multi-size records and to support the largest size records without distortion thereof during rotation upon said turntable, a shaft including an offset portion for receiving and holding a stack of records in a non-playing position from which position the records are individually released and dropped along said shaft to a playing position, the combination therewith of a restacking mechanism for elevating said stack of records to non-playing position comprising a disc disposed above said turntable and rotatable thereby, said disc having an outer margin extending beyond said turntable, means operable upon the termination of the playing of the last record of the stack to elevate the disc and to move the records upwardly along said shaft for placing said records upon said offset portion of said shaft and to thereafter lower said disc upon said turntable, said outer margin of said disc having tapered depending projections for coaxially aligning said disc with said turntable upon the lowering of said disc upon said turntable, said means including a ring spaced radially outwardly of said projections for supporting the outer margin of said disc during vertical movement of said disc, and devices for delaying the elevation of the stack until said turntable has substantially stopped, and said ring having a flange for allowing lateral movement of said disc as said records and disc are moved upwardly past the offset position of said shaft.

11. In an automatic record changer for continuously replaying a stack of records on a turntable, the control circuit comprising in combination an electrical motor for elevating the stack, a switch for energizing said motor including time delay means for closing said switch, at the end of a time period commencing with the end of playing of the last record in the stack; said time period being sufficient for the turntable to substantially expend its rotational energy.

12. The structur specified in claim 11 and further including a solenoid means and a second switch in electrical series with each other but in electrical parallel with said motor, said second switch including time delay means responsive to the energization of said motor for closing said second switch and energizing said solenoid means before the elevation of the stack of records is completed; said first mentioned time delay means including a third switch which, when closed, shunts the first delay means, energization of said solenoid means closing said third mentioned switch.

13. In an automatic record changer for continuously replaying a stack of records on a turntable by elevating the stack to a position above the turntable and sequentially dropping the records into playing position, the electrical circuit comprising in combination, a first electrical motor for playing the records, a second electrical motor for elevating the stack of records, a two position switch for energizing the said record playing motor when in the first position and for energizing the elevating motor when in the second position, a phonograph switch in electrical series with the first position of the two position switch for automatically de-energizing the record playing motor when the last record in the stack has been played, a first time delay switch in electrical parallel with the second position of the two position switch for energizing the elevating motor after a predetermined time delay period commencing with the deenergization of the record playing motor, means controlled by said elevating motor for moving said two position switch from said first position to said second position upon the energization of said elevating motor, actuating means for closing said phonograph switch, and a second time delay switch in electrical parallel with said elevating motor for energizing said actuating means to close said phonograph switch after a predetermined time delay period commencing with the energization of the elevating motor and terminating before completion of the elevation of the stack of records, and said first mentioned means returning said two position switch to said first position when the elevation of the stack of records is completed.

References Cited in the file of this patent

UNITED STATES PATENTS

| | | |
|---|---|---|
| 2,546,136 | Ristau et al. | Mar. 20, 1951 |
| 2,685,447 | Ristau et al. | Aug. 3, 1954 |
| 2,777,699 | Woodruff | Jan. 15, 1957 |
| 2,851,273 | Osborne | Sept. 9, 1958 |
| 2,886,327 | Goldenberg | May 12, 1959 |
| 2,906,536 | Mauerhoff | Sept. 29, 1959 |